FIG. I

INVENTORS.
THOMAS D. PARKS
CLARENCE I. GLASSBROOK
BY
ATTORNEY

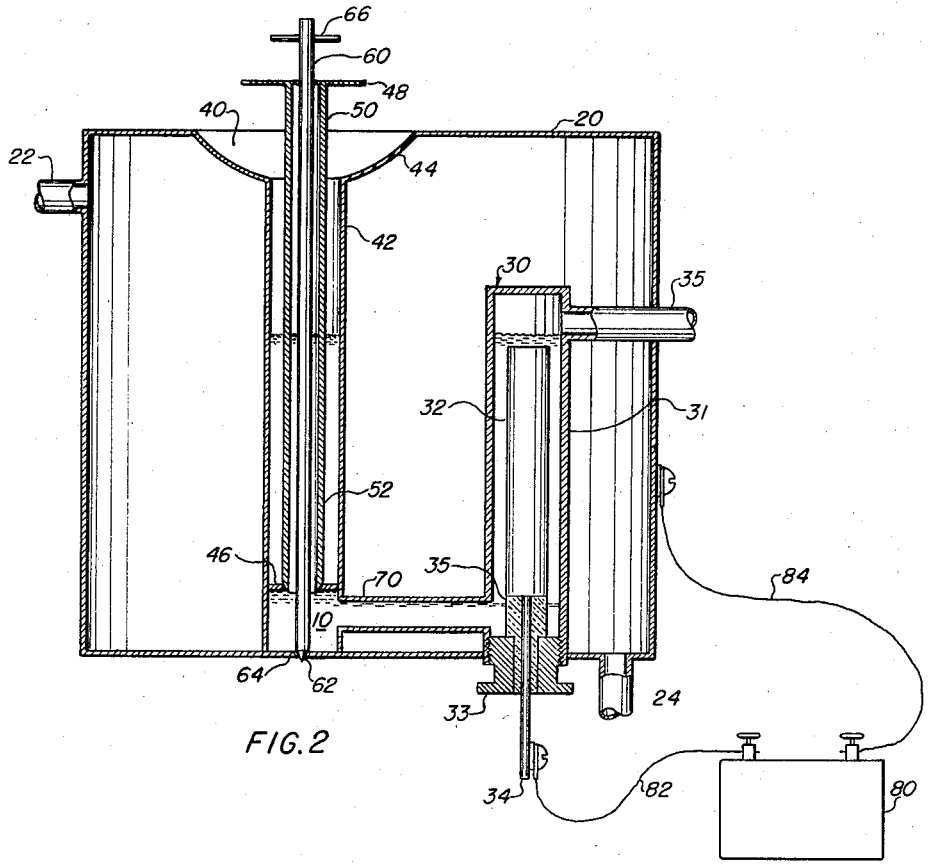
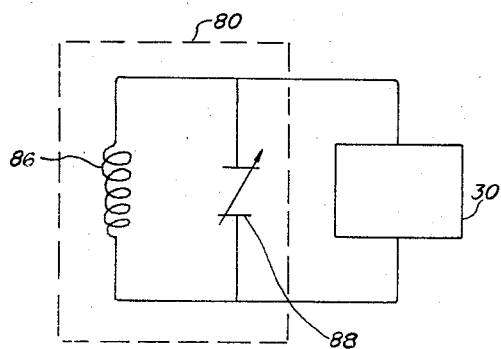
FIG. 2
FIG. 3
INVENTORS.
THOMAS D. PARKS
CLARENCE I. GLASSBROOK
BY Kenneth Swartwood
ATTORNEY

United States Patent Office 2,896,158
Patented July 21, 1959

---

2,896,158

METHOD OF ANALYZING BENZENE HEXACHLORIDE AND APPARATUS THEREFOR

Clarence I. Glassbrook, Hayward, and Thomas D. Parks, San Lorenzo, Calif., assignors to Ethyl Corporation, New York, N.Y., a corporation of Delaware Application December 6, 1954, Serial No. 473,234

1 Claim. (Cl. 324—61)

This invention relates generally to an analytical method and instrument, and more particularly to an analyzer and method for determining the gamma isomer content of benzene hexachloride mixtures.

Benzene hexachloride (1,2,3,4,5,6-hexachlorocyclohexane), hereinafter called BHC, is a valuable commercial insecticide which is formed by the free-radical chlorination of benzene, e.g. photochlorination. In manufacture, at least five separate steric BHC isomers are formed, only the gamma isomer having insecticidal activity. This isomer is normally present in the crude product in only about 10–20 percent concentration.

Purification of the gamma BHC isomer is very difficult. The common method of purification involves one or more extractions and crystallizations, using a selective solvent for the gamma isomer. For efficient operation of the process, it is imperative that an accurate and reliable method of analysis of the product be available for quality control of the process. For this purpose, the analytical method must be very rapid. Up to the present time, infrared analysis has been conventionally employed, although this method is not satisfactory for use under most manufacturing conditions. The principal disadvantages of the latter technique is that the method is too slow to permit effective control of the process and, in addition, this method of analysis requires elaborate and costly analytical equipment, which equipment can not normally be set up near the process site.

It is accordingly an object of the present invention to provide an improved apparatus and method for analyzing BHC isomer mixtures and particularly mixtures having a gamma isomer concentration of above about 80 percent. Another object is to provide a method and apparatus of the above type which can give rapid analyses of gamma isomer products and is otherwise suitable for use in the control of processes for the purifications of the gamma isomer from crude or technical BHC. Another object is to provide a method of the above type which gives highly accurate results, irrespective of the quantitative distribution of impurities therein and particularly which is essentially insensitive to relative variations of the alpha and delta BHC isomer content. Another object is to provide an apparatus which is simple, inexpensive, is easily used and which can be operated by inexperienced or nontechnical personnel. Other objects and advantages of the present invention will be more apparent from the following disclosure and appended claim.

Figure 2 is a sectional view, partly an elevation, of a suitable apparatus for analyzing BHC isomer mixtures which embodies the novel features of this invention; and Figure 3 is a schematic circuit diagram of a tunable electrical circuit.

Figure 1:
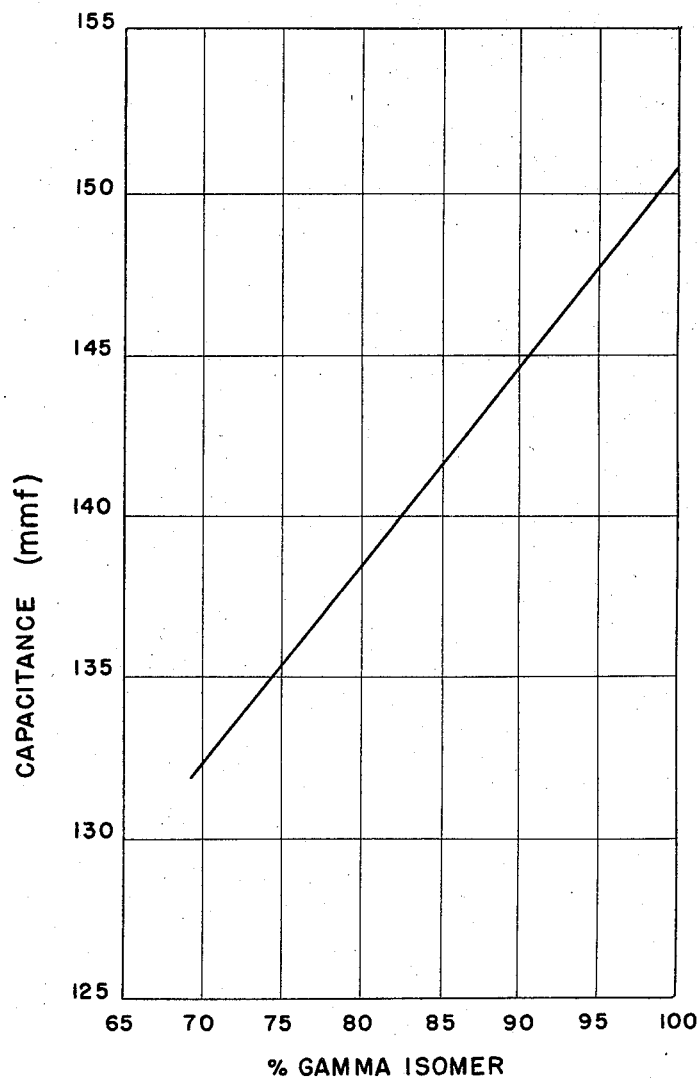
Figure 1 is a graph relating to the capacitance of BHC isomer mixtures to the gamma isomer purity of the mixtures.

It has now been found that the dielectric constant of BHC isomer mixtures has an essentially direct relationship to the BHC gamma isomer concentration, irrespective of variations in the principal impurities therein, and that a determination of the dielectric constant of such a mixture gives a highly accurate analysis of its gamma isomer content. The process is particularly useful for analyzing mixtures containing above about 80 percent and preferably above about 90 percent by weight of the gamma BHC isomer. Although it is true that the individual dielectric constants of the different BHC and chlorinated BHC isomers vary appreciably, the gamma BHC dielectric constant is apparently so much greater than those of the normal impurities that variations in the composition of the impurity does not materially affect the gamma isomer analysis. Moreover, in most isomer mixtures obtained by conventional purification techniques, the alpha and delta BHC isomers form a major part of the impurity and these isomers apparently have very similar dielectric properties. In consequence, changes in the weight ratio of the alpha and delta BHC isomers have little or no effect on the accuracy of the gamma BHC isomer analysis when employing the process and apparatus for the present invention.

The method of this invention is extremely simple, quick, efficient, economical and highly reliable. In general, it comprises measuring the dielectric constant of the mixtures to be analyzed, and thereafter determining its gamma isomer content by comparing the dielectric constant of the mixture with that of known standards. A preferred embodiment of the process comprises applying an alternating, high frequency voltage across a molten sample of the BHC to be analyzed, and measuring the capacitance of the cell. Preferably, the measurement comprises using a tunable electrical circuit having an adjustable capacitor or inductor and a test cell adapted to contain a molten sample of the material to be analyzed, the sample forming at least a part of the capacitance of the circuit. The circuit is then brought to resonance and the capacitance or change in capacitance of the circuit is used in determining the gamma content of the sample. In this determination, the dielectric constant, capacitance or change in capacitance can be related to a suitable graph relating these variables to gamma BHC content. Such a graph is shown in Figure 1, wherein the gamma purity is plotted against the capacitance of isomer mixtures. This graph plots the capacitance of various BHC mixtures measured in a cell having concentric nickel electrodes 0.010 inch thick. The inner electrode was a cylinder 1 cm. in diameter and 5 cm. long. The outer electrode was 1.5 cm. in diameter and 5 cm. long. The two electrodes were separated by glass braces to maintain a constant spacing of the electrodes. The capacitance measurements were made using molten BHC maintained at 145° C. Alternatively, the variable capacitance or inductance employed for turning the circuit can be calibrated directly in gamma units by analyzing samples of known purity.

The embodiment of the apparatus of this invention shown in Figure 2 is particularly suitable for making rapid analyses. Tests employing this apparatus can readily be carried out by relatively inexperienced or nontechnical personnel because of its simple operation. As shown in Figure 2 of the drawings, the analytical apparatus comprises a capacitance cell 30 and a melt pot 40 for feeding molten BHC to the cell. Both the cell and the melt pot are positioned within a steam jacket 20. A molten BHC feed valve 50 and a flush valve 60 are employed to control the flow of BHC to the cell and to flush the cell after completion of an analysis. The valves 50 and 60 are also enclosed within the steam jacket 20 and are heated by steam entering the jacket through an inlet 22. Steam or condensate is removed from the steam jacket through an outlet 24.

The melt pot 40 and capacitance cell 30 are interconnected adjacent the bottoms thereof by a connector tube 70 so as to permit melted BHC 10 within the melt pot 40 to flow by gravity to the capacitance cell. The latter cell comprises an external tubular condenser forming an electrode 31. Another smaller electrode 32 is positioned within the electrode 31 in axial alignment therewith. An aligning sleeve 33 is threaded into the lower end of the electrode 31 and is provided with an axial opening through which an elongated extension 34 of the electrode 32 extends. An insulator 35 surrounds the electrode extension 34 and also spaces the lower portion of the electrode 32 from the aligning sleeve 33. A molten BHC overflow tube 35 is provided at the upper end of the electrode 31 which extends through the external wall of the steam jacket 20 and assures a constant level of BHC in the capacitance cell for each test. Excess molten BHC fed to the cell preparatory to making an analysis will overflow by gravity to a point external the unit.

The electrodes 31 and 32 are connected to a high frequency alternating current source and to a meter 80, hereinafter described in detail, by means of electrical leads 82 and 84, respectively. The electrodes can be formed of a wide variety of metals including silver, gold, platinum, nickel, aluminum and the like. Alloys of these metals are also suitable. The electrodes can be formed completely from the metal or can be coated or plated on other materials. In some cases it is desirable to use a wire screen electrode.

The melt pot 40 comprises an elongated tube portion 42 and an upper cup portion 44 which is secured along its perimeter to the steam jacket 20. The cup portion 44 is adapted to receive powdered or solid BHC. Upon melting, the BHC then flows into the annular space between the wall 42 and the feed valve 50.

The feed valve 40 and the flush valve 60 are concentrically arranged and both are aligned axially within the melt pot. As shown, the feed valve has a tubular form and is provided with a tapered lower end portion 52 which is adapted to seat, in the closed position, on a valve seat 46 near the bottom of the melt pot, preferably just above the connector tube 70. The upper end of the feed valve is provided with a closure plate 48 which is slidable on the flush valve 60. The closure plate also forms a handle for moving the feed valve upwardly when it is desired to fill the capacitance cell with a fresh sample of BHC.

The flush valve 60 comprises an elongated rod having lower tapered end 62 which is adapted to seat in a valve opening 64 provided in the bottom of the steam jacket 20. The flush valve is also provided with a handle portion 66 to facilitate operation of the valve.

In operation, a quantity of a BHC sample is placed in the cup 44 of the melt pot 40 and is heated by the steam within the steam jacket 20. The melted BHC then flows into the annular spaced bottom of tube 42 and the feed valve 50. Normally, sufficient BHC is melted in the melt pot to essentially fill the cup 44. Thereafter the feed valve is raised to open the valve seat 46 and permit the molten BHC to flow by gravity through the connector tube 70 into the annular space in the capacitance cell between the electrodes 31 and 32. The feed valve 50 is maintained in an open position until the BHC begins to overflow through the tube 35. During this operation, the flush valve 60 is maintained in a closed position.

After filling the capacitance cell in the manner described, an alternating high frequency voltage is then applied across the electrodes. The electrical circuit, including the sample being tested, is then brought to resonance by suitable adjustment of a variable capacitor or inductor. The reading on the variable capacitance or inductance of the circuit indicates the purity of the sample. Preferably the meter 80 is calibrated directly in gamma isomer units to permit a direct reading of the analysis of the gamma isomer content of the sample, although a chart or table correlating the variable capacitance with the gamma BHC content can be employed if desired.

The meter 80 contains all of the electrical circuit, excepting the capacitance test cell 30. A simplified flow diagram is shown in Figure 3 in which are provided an inductor 86 and a variable capacitance 88 in parallel with the sample capacitance cell 30. In this embodiment, the meter operates on a capacitive retune principle. The test sample cell is in parallel with the calibrated capacitor or capacitors. The frequency and inductance of the circuit is maintained constant and the total capacitance is also maintained constant in accordance with the following formula $$F = \frac{1}{2\pi\sqrt{LC}}$$

wherein F is the frequency, L is the inductance and C is the total capacitance. The total capacitance is the summation of the capacitance of the test cell and the capacitance of the meter. Thus, adjustment of the variable capacitance is a function of the gamma content of the sample. Preferably, this variable capacitance, as pointed out above, is calibrated directly in gamma isomer units so that the purity of the sample can be read directly from the instrument when the circuit is tuned.

The meter can operate on any suitable source of alternating current, for example, 110–120 volts A.C. 60 cycles. The use of a 5 megacycle resonant circuit has been found particularly satisfactory, although essentially any frequency is equally suitable.

We claim:

The method of analyzing benzene hexachloride isomer mixtures containing the gamma isomer in at least 80 weight percent concentration and containing impurities having an identical chemical composition but being stereoisomers thereof, including the alpha and delta benzene hexachloride isomers, to determine the gamma isomer content of said mixture, comprising measuring the total dielectric constant of said mixture while said mixture is in a molten state and determining the quantity of said gamma isomer in said mixture by comparing the total dielectric constant measurement of said mixture with a known standard.

References Cited in the file of this patent

UNITED STATES PATENTS

| | | |
|---|---|---|
| 2,071,607 | Bjorndal | Feb. 23, 1937 |
| 2,485,579 | Elliott | Oct. 25, 1949 |
| 2,540,146 | Stober | Feb. 6, 1951 |
| 2,599,583 | Robinson et al. | June 10, 1952 |
| 2,654,067 | Bruce | Sept. 29, 1953 |